(12) United States Patent
Cordua et al.

(10) Patent No.: US 10,967,523 B2
(45) Date of Patent: Apr. 6, 2021

(54) MACHINE FOR THE PROCESSING OF LINEN ITEMS IN AN INDUSTRIAL LAUNDRY, A METHOD FOR OPERATING THE MACHINE, AND AN INDUSTRIAL LAUNDRY

(71) Applicant: Jensen Denmark A/S, Rønne (DK)

(72) Inventors: Kim Cordua, Rønne (DK); Morten Lundt, Rønne (DK)

(73) Assignee: Jensen Denmark A/S, Rønne (DK)

( * ) Notice: Subject to any disclaimer, the term of this patent is extended or adjusted under 35 U.S.C. 154(b) by 0 days.

(21) Appl. No.: 16/755,545

(22) PCT Filed: Oct. 8, 2018

(86) PCT No.: PCT/EP2018/077293
§ 371 (c)(1),
(2) Date: Apr. 10, 2020

(87) PCT Pub. No.: WO2019/072751
PCT Pub. Date: Apr. 18, 2019

(65) Prior Publication Data
US 2020/0262652 A1    Aug. 20, 2020

(30) Foreign Application Priority Data
Oct. 13, 2017   (DK) .............................. PA201770778

(51) Int. Cl.
*B25J 15/00*   (2006.01)
*B65G 17/20*   (2006.01)
(Continued)

(52) U.S. Cl.
CPC .......... *B25J 15/0052* (2013.01); *B65G 17/20* (2013.01); *B65G 47/1492* (2013.01);
(Continued)

(58) Field of Classification Search
CPC .......... B25J 15/0028; B25J 15/0052; B25J 15/0061; B66C 1/58; G05B 2219/39469;
(Continued)

(56) References Cited

U.S. PATENT DOCUMENTS 5,333,402 A * 8/1994 Weir ...................... D06F 67/04
                                                        271/268
5,440,810 A   8/1995 Borucki
(Continued)

FOREIGN PATENT DOCUMENTS

DE    3844764 C2   9/1992
EP    0272368 A1   6/1988
(Continued)

OTHER PUBLICATIONS

DK Search Report for Application No. PA2017 70778, dated Apr. 3, 2018, 1 page.
(Continued)

*Primary Examiner* — Gregory W Adams
(74) *Attorney, Agent, or Firm* — McDermott Will & Emery LLP (57) ABSTRACT

The present invention relates to a machine (50) for the processing of linen items (L) in an industrial laundry (1), such as for receiving, reorienting and transferring a linen item (L) from a loader (100) to a movable linen carrier (20), with a transfer mechanism (200) comprising:
a carriage (250),
a drive (201) for moving said carriage (250) between a loading posi-tion and a discharge position,
said carriage (250) including a frame structure (257) with two spaced apart clamping structures (270), each being rotationally connected to the frame structure (257),
each clamping structure (270) comprising two spaced apart activata-ble clamps (229), and
(Continued)

actuators (251, 280) for said rotation and said activation of said clamps (229).

9 Claims, 10 Drawing Sheets

(51) Int. Cl.
| | |
|---|---|
| *B65G 47/14* | (2006.01) |
| *D06F 67/04* | (2006.01) |
| *D06F 95/00* | (2006.01) |
| *B65G 47/90* | (2006.01) |
| B65G 17/32 | (2006.01) |
| B23Q 3/155 | (2006.01) |

(52) U.S. Cl.
CPC .......... *B65G 47/907* (2013.01); *D06F 67/04* (2013.01); *D06F 95/00* (2013.01); *B23Q 2003/155418* (2016.11); *B65G 17/323* (2013.01)

(58) Field of Classification Search
CPC .......... G05B 2219/39571; B65G 17/20; B65G 17/323; B65G 47/1492; B65G 47/24; B65G 47/90; B65G 47/907; B65G 47/918; D06F 67/04; D06F 95/00; H01L 21/68; B65D 71/50; B65B 35/36; B23Q 2003/155418; B23Q 2003/155425
See application file for complete search history.

(56) References Cited

U.S. PATENT DOCUMENTS

| | | | |
|---|---|---|---|
| 2004/0050655 A1* | 3/2004 | Baboz | D06F 95/00 198/339.1 |
| 2009/0260950 A1 | 10/2009 | Heinz et al. | |
| 2013/0249157 A1* | 9/2013 | Endo | B25J 9/026 269/56 |
| 2015/0361610 A1* | 12/2015 | Yano | D06F 67/04 414/13 |

FOREIGN PATENT DOCUMENTS

| | | |
|---|---|---|
| EP | 2947198 A1 | 11/2015 |
| EP | 3202970 A1 | 8/2017 |
| JP | H11114296 | 4/1999 |
| WO | 2016162334 A1 | 10/2016 |
| WO | 2019072751 A1 | 4/2019 |

OTHER PUBLICATIONS

International Search Report for PCT/EP2018/077293 dated Nov. 30, 2018, 3 pages.
Written Opinion for PCT/EP2018/077293 dated Nov. 30, 2018, 7 pages.

* cited by examiner

Fig. 1B

Main components of example
layout comprising 2 bufferlines
for sorting:

A Delivery conveyor
B Loading stations
C Buffer with two sortings
D Deloading stations
E Logic Automatic Feeder

MACHINE FOR THE PROCESSING OF LINEN ITEMS IN AN INDUSTRIAL LAUNDRY, A METHOD FOR OPERATING THE MACHINE, AND AN INDUSTRIAL LAUNDRY

CROSS-REFERENCE OF RELATED APPLICATIONS

This application is the U.S. National Phase under 35 U.S.C. § 371 of International Patent Application No. PCT/EP2018/077293, filed on Oct. 8, 2018, which in turn claims the benefit of Denmark Patent Application No. PA201770778, filed on Oct. 13, 2017 the entire disclosures of which Applications are incorporated by reference herein for all purposes.

SUMMARY

The present invention finds particular use in an after-the-washers section 1 of an industrial laundry, which section is for the processing of individualized and washed table or bed linen or similar laundry conveyed to a spreader.

Operations prior to the insertion of the laundry items into common spreaders typically involve picking up each linen item manually by a person who must first locate two adjacent corners of the linen item and then insert each corner into a respective one of two clamping devices mounted onto a carrier movably supported by an overhead conveyor for movement through the laundry to the spreader. This procedure is time consuming.

The present invention aims at solving the aforementioned problem by providing a machine suitable for operations in connection with conventional spreaders.

Specifically, the machine of the invention has a transfer mechanism for receiving, reorienting and transferring a linen item from a loader to a movable linen carrier, and comprising a carriage, a drive for moving the carriage between a loading position and a discharge position, the carriage including a frame structure with two spaced apart clamping structures, each being rotationally connected to the frame structure, each clamping structure comprising two spaced apart activatable clamps, and actuators for said rotation and said activation of the clamps.

Preferably, the clamping structures are each configurable to assume i) a first configuration for receiving and holding a linen item corner portion extending in a generally vertical plane and extending between the two spaced apart clamps, and ii) a second configuration upon said rotation with said linen item corner portion extending generally horizontally and extending between the two spaced apart clamps.

In a preferred embodiment the machine includes a linen item loader of the type including two opposed conveyor belts allowing the linen item to be drawn through the loader from a feeding side thereof, whereby two corners at a rear edge of the linen item are the last linen item portions discharged from the loader opposite the feeding side, thereby allowing corner portions of the linen item to be presented to the clamps while extending in the generally vertical plane.

DETAILED DESCRIPTION

Figure 1A:
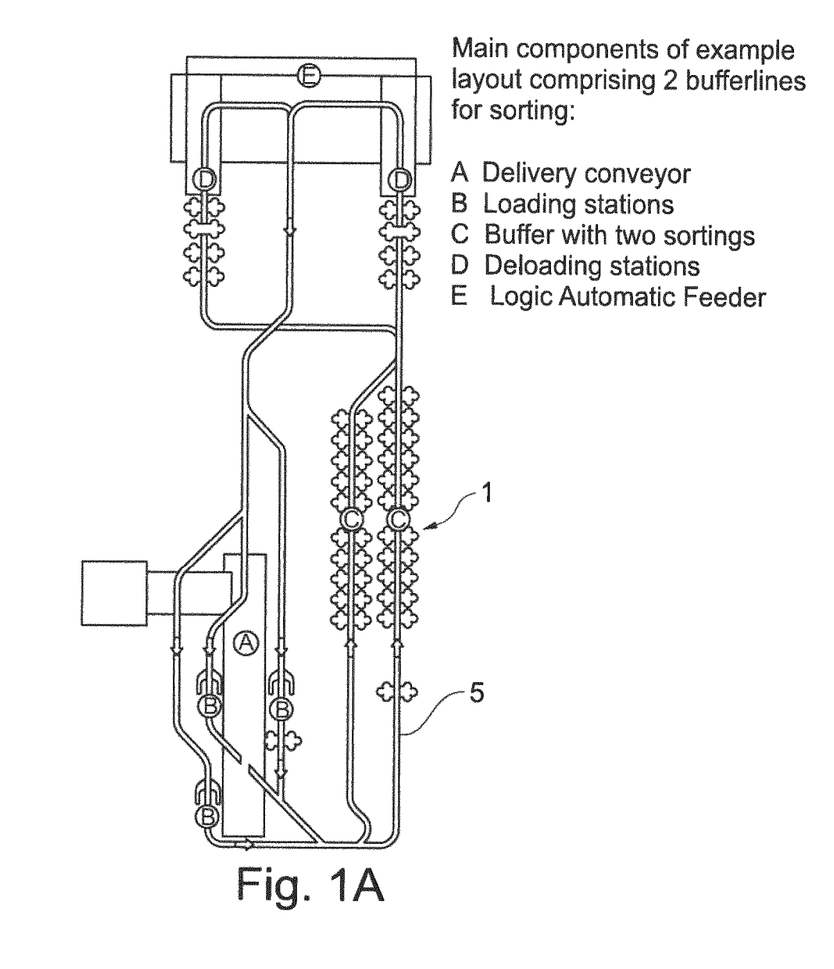
FIG. 1A shows, seen from above, an exemplary layout of an after-the-washers section 1 of an industrial laundry.

The invention will now be explained in more detail below by reference first to FIG. 1A which shows, seen from above, an exemplary layout of an after-the-washers section 1 of an industrial laundry, which section is for the processing of individualized and washed table or bed linen or similar laundry, in the following referred to as linen items. Such an after-the washers section 1 typically includes a first station A to which washed linen items are delivered, a buffer station C for storing washed linen items hanging each suspended from an overhead conveyer 5, and a spreader E to which the hanging linen items are delivered one by one and by means of which each linen item is first spread out and then fed, lying flat on a conveyor, to an ironer or other equipment (not shown in FIG. 1A).

At station B each linen item is normally picked up manually by a human operator who first locates two adjacent corners of the linen item. Each corner is then inserted by the operator into a respective one of two clamping devices mounted onto a carrier movably supported by the overhead conveyor 5 for movement through the section 1. Generally, the overhead conveyor 5 supports a relatively large number of such carriers that each have two clamping devices, see by way of example EP 3202970.

Figure 1B:
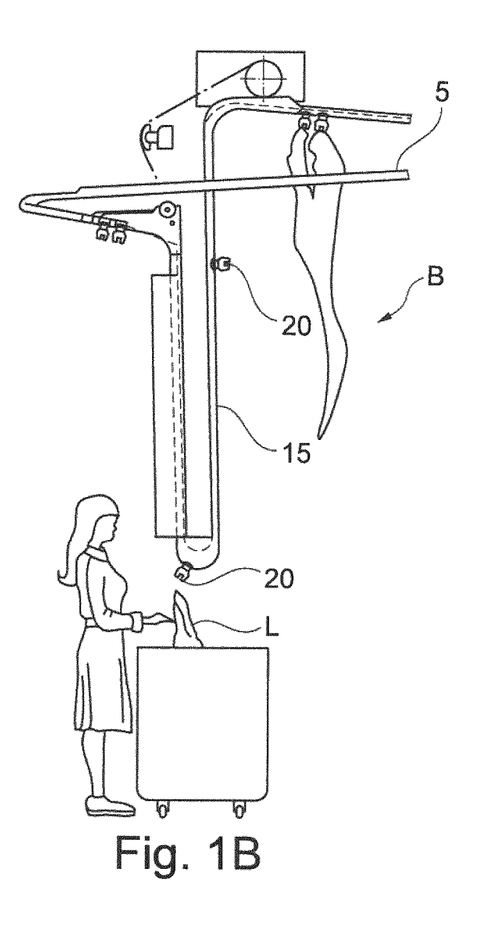
FIG. 1B shows an example of the layout of station B in a prior art after-the washers section.

FIG. 1B shows an example of the layout of station B in a prior art after-the washers section 1, numeral 15 referring to a loop part of the overhead conveyor 5 that extends to the operating level of the operator, at which level the corners of the linen items L are inserted manually into the aforementioned clamping devices mounted in pairs on a carrier 20 that moves along the overhead conveyor 5.

WO2016/162334 discloses a spreader for spreading out linen items. The spreader has a loader for automatically locating the corners of a washed linen item when a front edge of the linen item is introduced on a feeding side of the loader between two opposed running conveyor belts of the loader. When the linen item is drawn through the loader by the two opposed conveyor belts, the two corners at the rear edge of the linen item will be the last linen item portions discharged from the loader opposite the feeding side, thereby allowing each one of the two adjacent rear edge linen item corners to be presented in a well-defined manner to a respective transfer clamp configured for gripping around that corner. The linen item is then transferred to a pair of spreader clamps for the subsequent spreading out of the linen item by moving the two corners apart using the spreader clamps.

The spreader of WO2016/162334 differs from the more common type of spreaders where each of two adjacent corners of the linen item is presented to a corresponding spreader clamp by a transfer gripper that includes two spaced apart clamps together holding on to one elongated corner portion of a certain length.

In the aforementioned more common type of spreader the elongated corner portions are presented to the spreader clamps in a configuration where they extend generally horizontally, permitting for each corner portion a respective spreader clamp to enter in between the two spaced apart clamps holding the corner portion to receive and hold on to the linen item. Then the two spreader clamps move apart to spread out the linen item. Normally, for presenting the linen items in this manner to the spreader clamps has each corner portion of the linen item previously been introduced manually between pairs of jaws where each pair of jaws defines one of two spaced apart clamps of the transfer gripper.

Figure 2A:
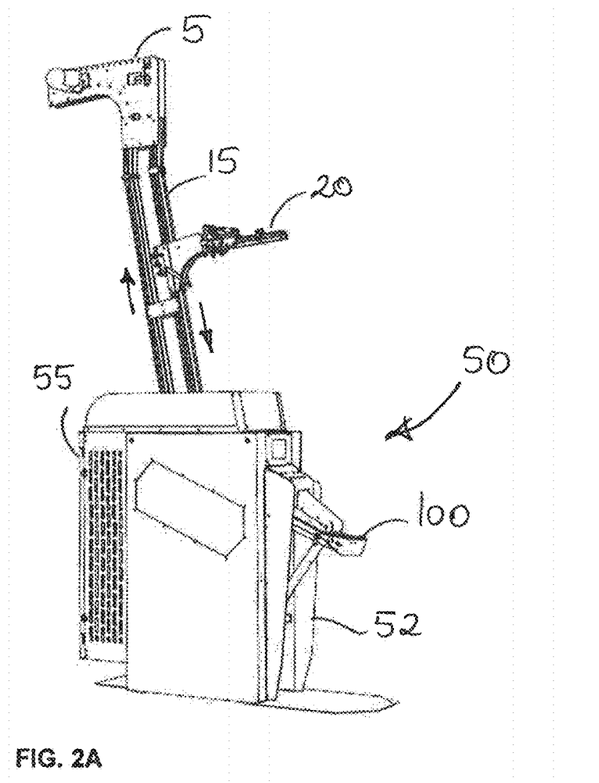
FIG. 2A is a perspective view of a machine of the invention.

The present invention is concerned with a machine 50 as shown in FIG. 2A which simplifies the work at station B and which allows for the subsequent spreading out of pieces of linen, such as when using a spreader of the aforementioned more common type where the linen items must be presented to the spreader clamps in a condition where corner portions thereof extend generally horizontally.

Figure 2B:
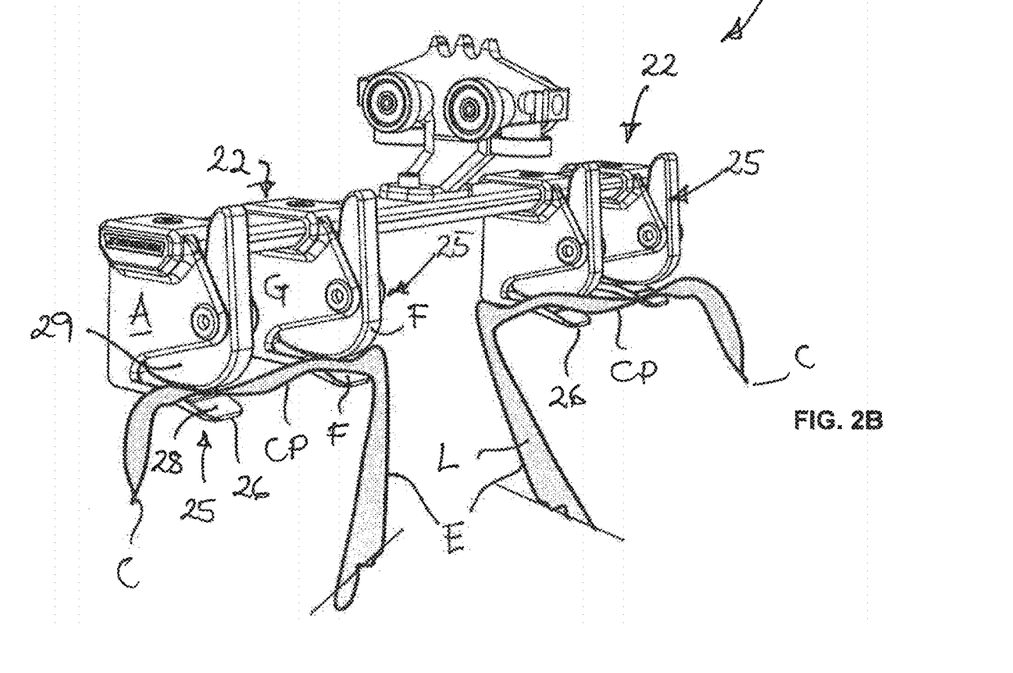
FIG. 2B shows an overhead conveyor carrier with two clamping devices.

FIG. 2B shows an overhead conveyor 5 carrier 20 with two clamping devices 22, each clamping device 22 comprising two clamps 25 each defined by two opposed jaws 28, 29. The carrier 20 carries a linen item L having a front edge E; as shown, near each adjacent corner C of the linen item L is an elongated corner portion CP held by a respective clamping device 22 such that each corner portion CP extends generally horizontally between two associated clamps 25 of the clamping device 22. In operation of the machine 50 linen items L are delivered to the carrier 20 in a manner allowing insertion of the linen items L between the jaws 28, 29 of the clamps 25 as shown in FIG. 2B such that the linen L items may be conveyed onwards with horizontally extending corner portions CP to a spreader of the aforementioned common type in an after-the washers section 1.

The opposed jaws 28, 29 may preferably be of the spring loaded type opening up when a force is applied onto the face F of one of the jaws 29, such as when a linen L item is pushed into the gap between the opposed faces F of the jaws 28, 29. By adjusting the spring load relatively heavy linen L items may be reliably suspended in the shown manner from the carrier 20 as it is conveyed from the machine 50, through the section 1 towards the buffer station C. It is noted that the frictional force holding the corner portions CP in place may still be overcome by applying a sufficient force onto the linen item L oriented along the general direction of the elongated corner portions CP.

The machine 50 has a front side 52 with a loader 100 which may be of the aforementioned type discussed in the context of WO2016/162334, and preferably including two opposed conveyor belts. To the loader 100 an operator may manually supply individual linen items L. A loop part 15 of the overhead conveyor 5 shown only partially in FIG. 2A extends to a rear part 55 of the machine 50 and serves to convey carriers 20 to and away from the machine 50, such as shown by way of example along the direction of the arrows indicated in FIG. 2A. Upon arrival of a carrier 20 into correct position at the rear part 55 a transfer mechanism to be discussed below receives, reorients and transfers a linen item L from the loader 100 to the carrier 20. The linen item L is received between the jaws 28, 29 of the carrier 20 through movement of the carrier 20 and/or a dedicated movement of the transfer mechanism 200.

An embodiment of the invention where a linen item L is transferred to the carrier 20 and received between the jaws 28, 29 through a movement only of the transfer mechanism will be discussed below, the transfer mechanism being designated generally the numeral 200.

Figure 3A:
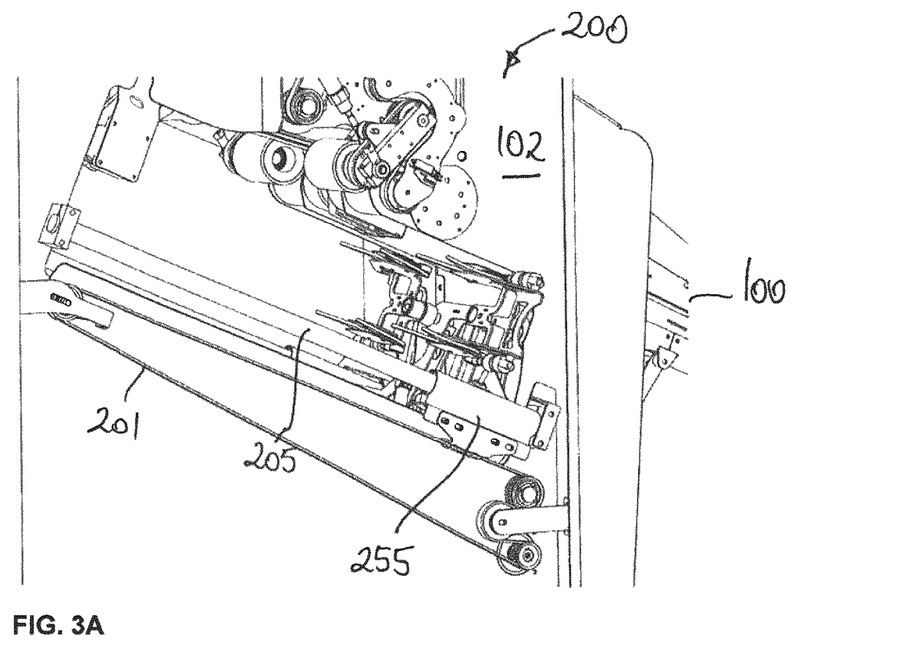
FIGS. 3A and 3B show perspective front and rear views of an embodiment of a transfer mechanism of the invention.
Figure 3B:
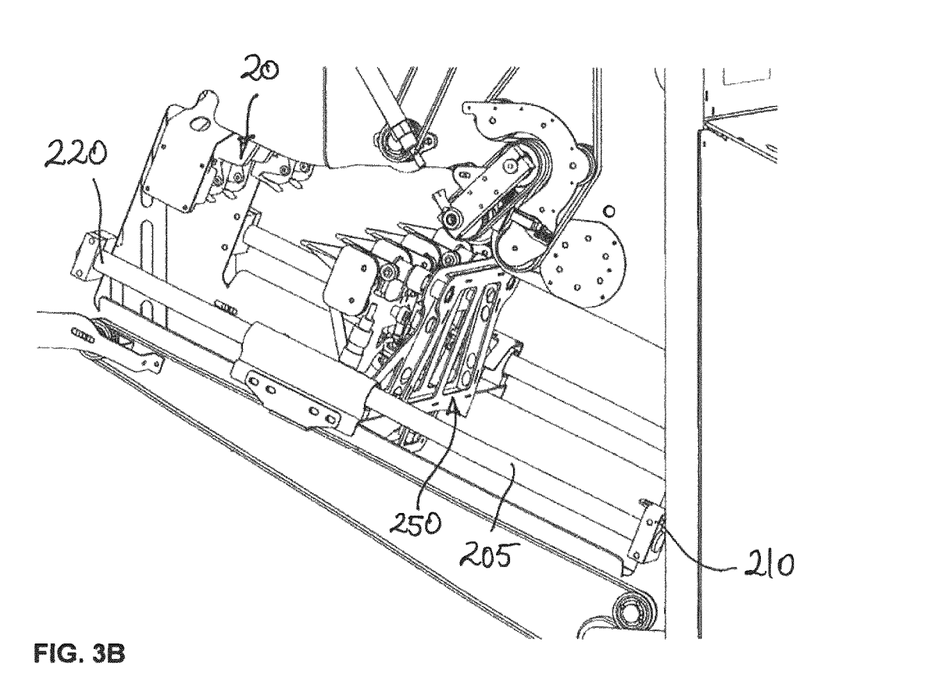

FIGS. 3A and 3B show perspective front and rear views of an embodiment of the transfer mechanism 200 of the invention, located at the rear side of a front wall 102 part of a housing enclosing the transfer mechanism 200. A portion of the loader 100 is visible on the front side of the front wall 102.

The transfer mechanism 200 generally includes a carriage 250 and an elongated guiding structure 205 onto which the carriage 250 is mounted so as to be movable by the action of a chain drive or other drive away from a retracted position close to the front wall 102 as shown in FIG. 3A towards a carrier 20 located in an elevated waiting position opposite the front wall 102 of the housing, as shown in FIG. 3B. The carriage 250 moves along a course defined by the orientation of the guiding structure 205. In performing this movement the carriage 250 temporarily stops at a loading position shown in FIG. 5B where the transfer mechanism receives a linen item L.

Figure 4A:
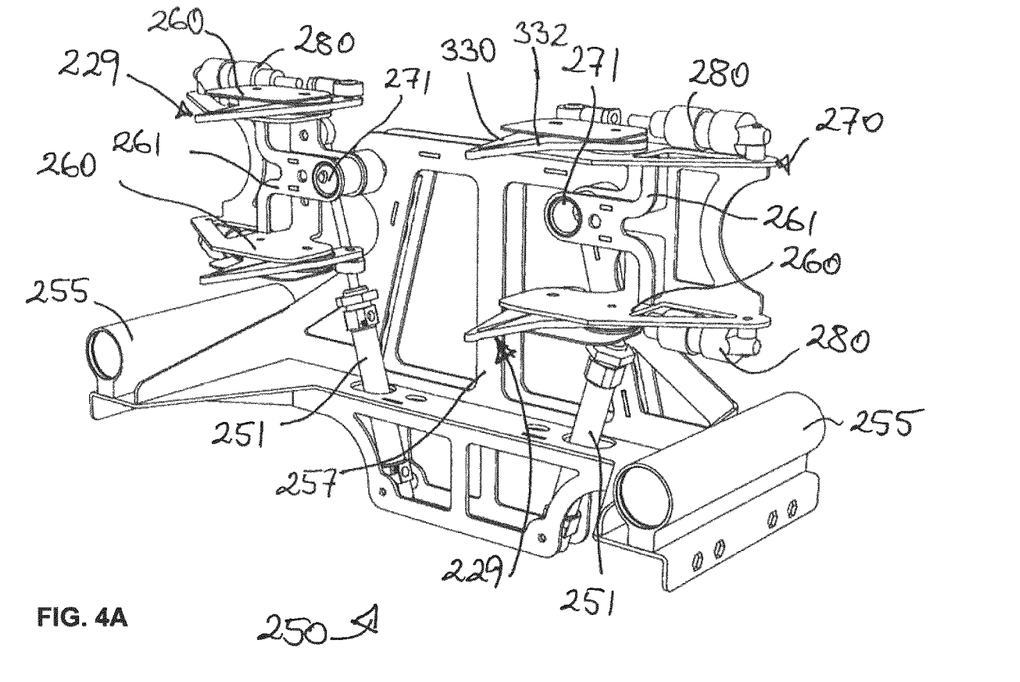
FIGS. 4A-E show a carriage part of the transfer mechanism with four clamps mounted thereon in various configurations.
Figure 4B:
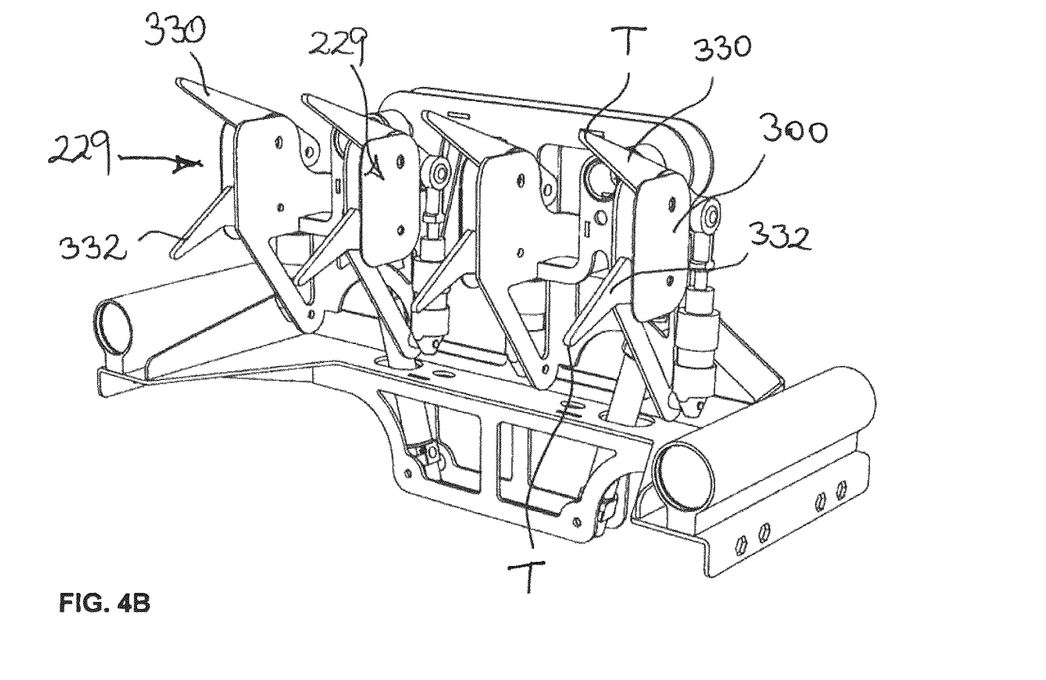
Figure 4C:
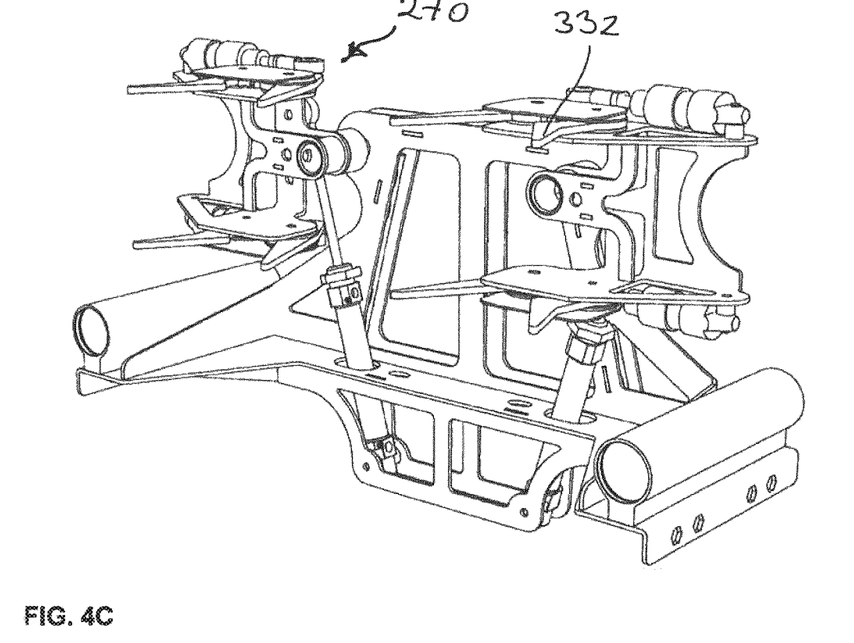
Figure 4D:
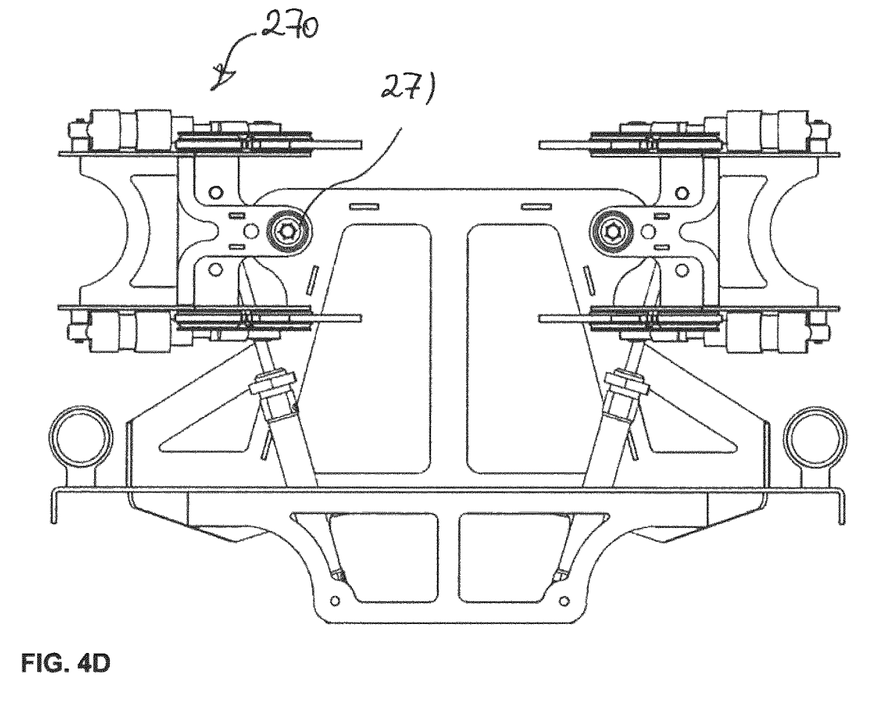
Figure 4E:
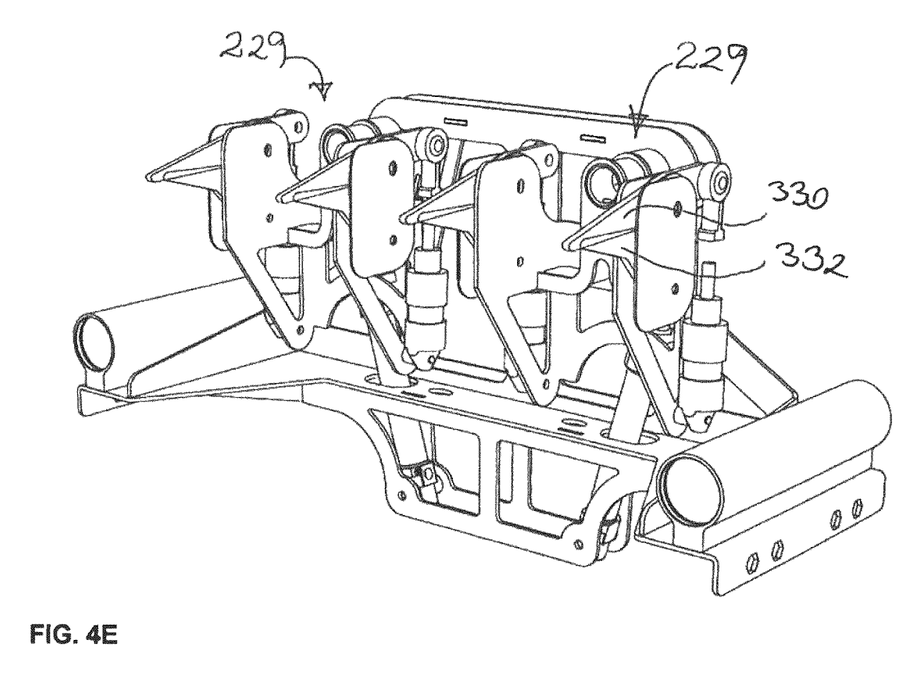

FIGS. 4A-E show the carriage 250 with four clamps 229 mounted thereon in various configurations, FIG. 4C illustrating the clamp 229 configuration shown in FIG. 3A, and FIG. 4E illustrating the clamp 229 configuration shown in FIG. 3B. FIG. 4D shows the carriage with the clamp configuration of FIG. 4C, seen in a front view. To provide an easy overview FIGS. 3A, 3B, and 4A-4E show the various configurations of the transfer mechanism without illustrating at the same time a linen item L, the transfer of a linen item L being illustrated generally in FIGS. 5A-F.

Turning to FIG. 4A the carriage 250 is shown as comprising a frame structure 257 supporting two spaced apart clamping structures 270 as well as two opposite tubular structures 255 receiving the elongated guiding structure 205 as shown in FIG. 3A. The two clamping structures 270 comprise, in the shown embodiment, the same components and are each pivotally connected to the frame structure 257 through a respective turning axle 271 joined to a base plate 261 of each clamping structure 270. A respective actuator 251 connected on the one hand to the base plate 261 and on the other hand to the frame structure 257 may be activated for rotating a corresponding clamping structure 270 relative to the frame structure 257 between a first position shown in FIGS. 4A and 4C and a second position shown in FIGS. 4B and 4E; the axis of rotation is preferably aligned with the guiding structure 205/the direction along which the carriage 250 moves.

Each clamping structure 270 comprises in addition a pair of opposed side plates 260 extending perpendicularly to the base plate 261 and to each of which side plate 260 is mounted a pair of jaws 330, 332 defining a respective clamp 229. Also connected to each side plate 260 is an actuator 280 for opening and closing a corresponding clamp 229, i.e. for moving the jaws 330, 332 towards and away from each other. Any number of actuators 280 may of course be used for actuation of the four shown clamps 229 of the two clamping structures 270.

Operation of the transfer mechanism 200 will now be explained with reference to FIGS. 5A-5E.

Figure 5A:
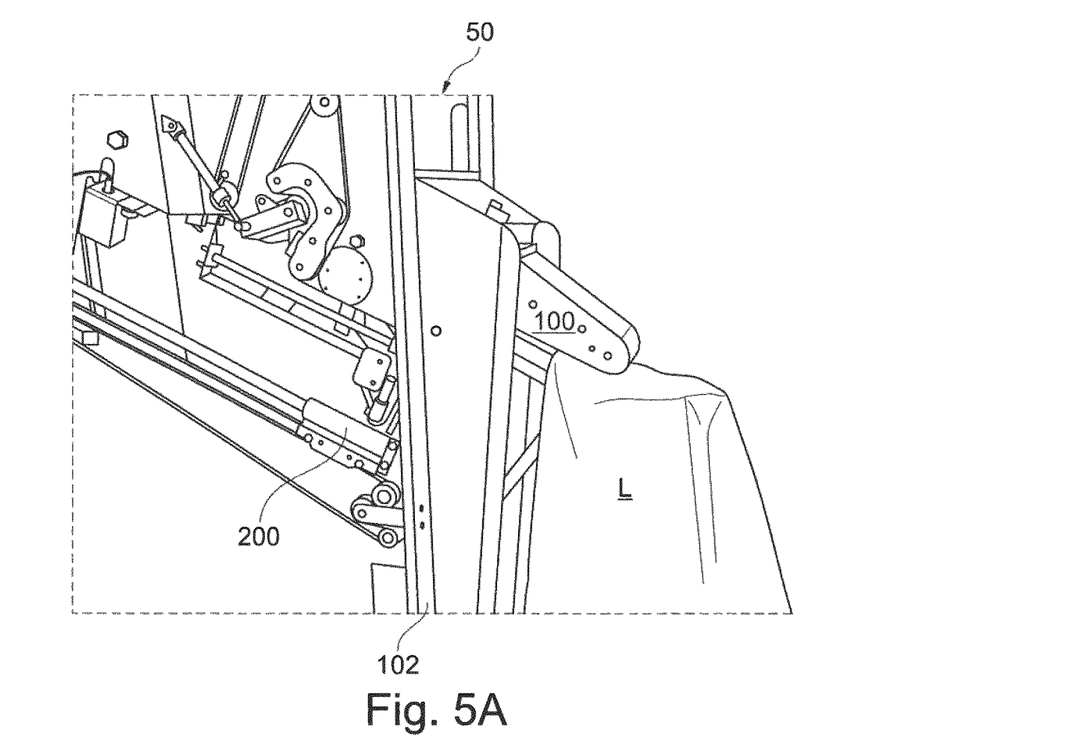
FIGS. 5A-F show various stages during operation of the transfer mechanism.

FIG. 5A shows the carriage 250 in the aforementioned retracted position and with the two clamping structures 270 having previously been rotated to the position shown in FIG. 4C, with the jaws 330, 332 being spread apart as shown. At this time a linen item L is loaded at the front side of the machine 50. Activation of the loader 100 leads to the linen item L being drawn into the machine 50 such that two elongated corner portions CP eventually appear inside the machine 50, hanging suspended from the loader 100 and with the remaining part (not shown) of the linen item L lying on the bottom of the machine 50.

Figure 5B:
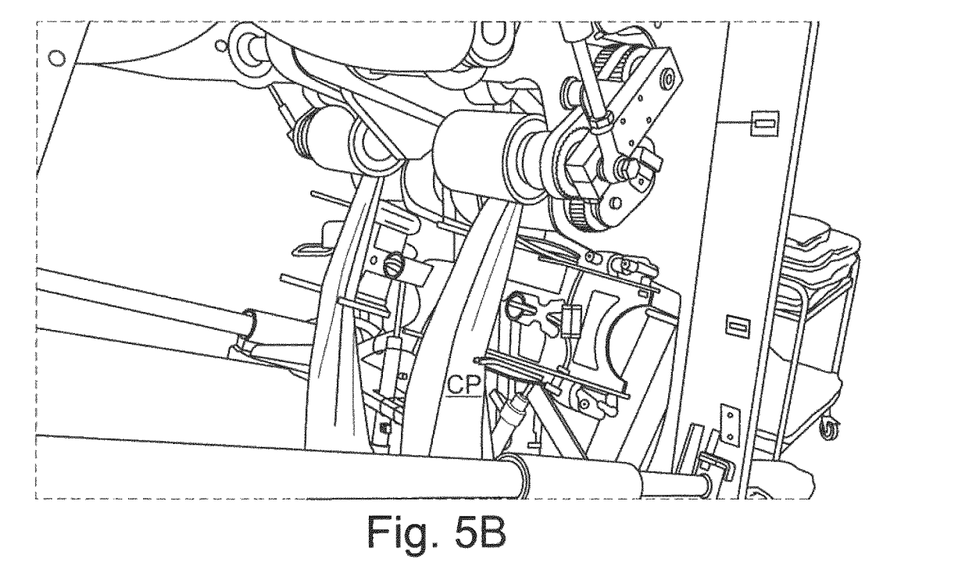

At the same time as the corner portions CP appear inside the machine 50 are they presented to the carriage 250 being in the configuration of FIG. 4C in that the carriage 250 has moved forward from the retracted position to reach the aforementioned loading position also shown in FIG. 5B. In this position of the carriage 250 is each one of the two elongated corner portions CP extending in the gap between the spread apart jaws 330, 332 of the two pairs of clamps 229 of a corresponding clamping structure 270. As can be seen the corner portions CP at this time and in the shown embodiment extend in a generally vertical plane, possibly oriented at a small angle to the vertical, corresponding to an inclined position of the carriage 250 reflecting a correspondingly inclined extension of the guiding structure 205.

Figure 5C:
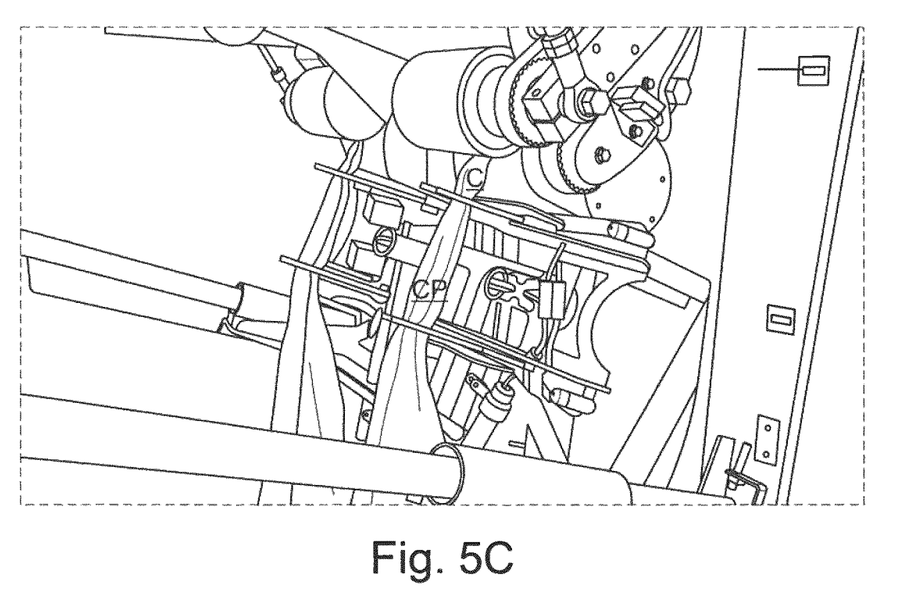

Next, i.e. around the time where the corner portions CP leave the loader 100, see FIG. 5C are the four actuators 280 activated to close the clamps 229 by moving the jaws 330, 332 together, thereby holding on to the corner portions CP.

Figure 5D:
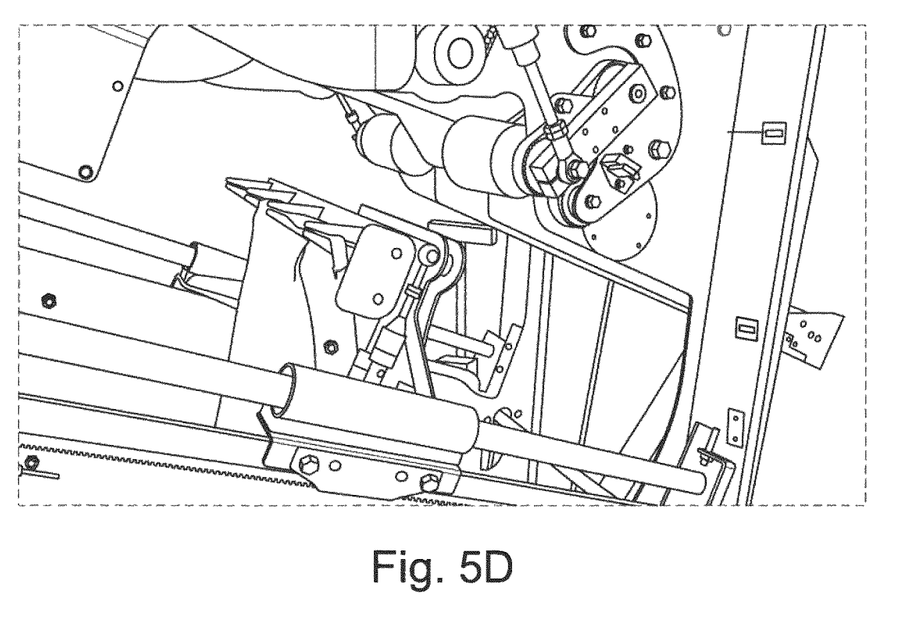
Figure 5E:
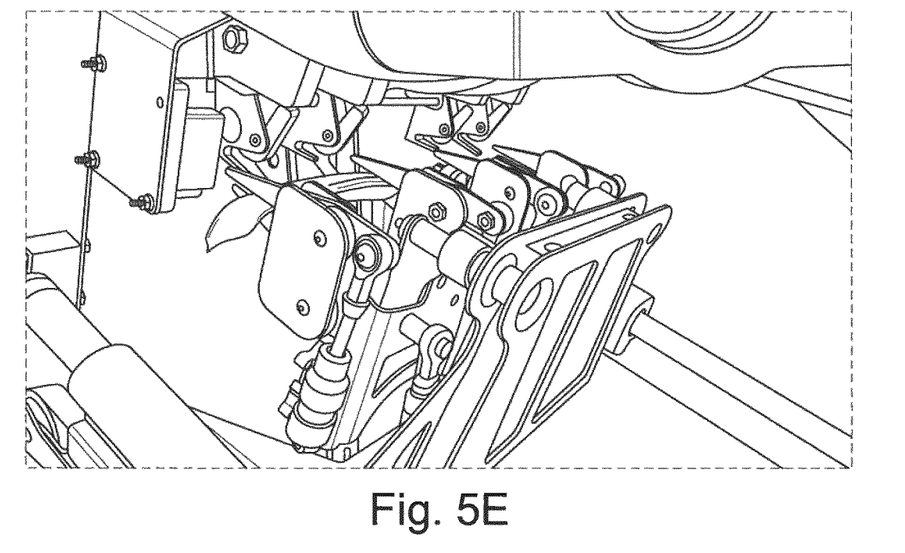
Figure 5F:
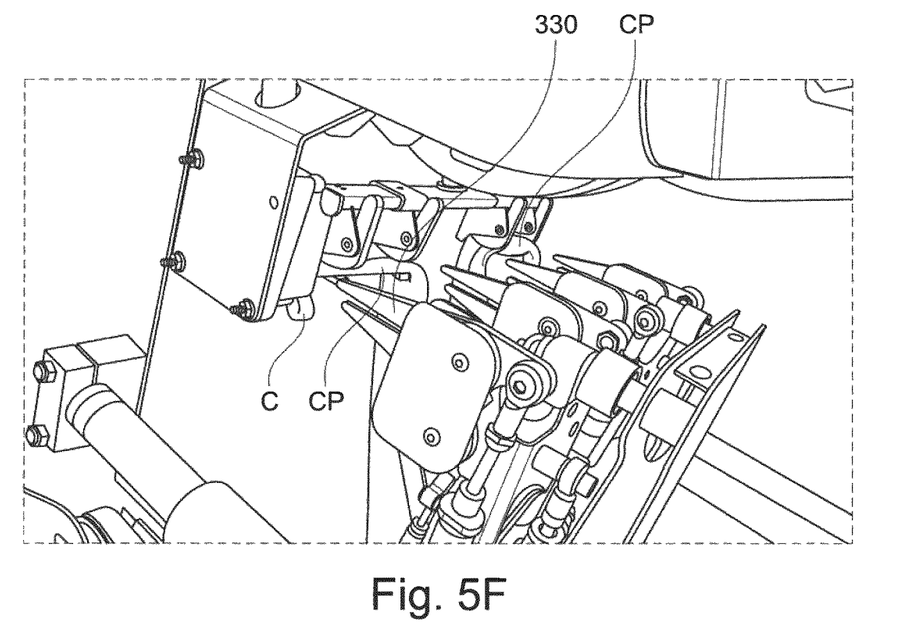

The carriage 250 is now moved further forwards along the guiding structure 205 while at the same time each of the two clamping structures 229 are rotated into the position shown in FIGS. 4E and 5D, thereby rotating the two corner portions CP so as to extend essentially horizontally. As shown in FIG. 5E carriage 250 in a continuous movement then moves further on towards a discharge position at a carrier 20 located at the end of the guiding structure 205, with the tips 26 of the clamps 25 thereof facing the corner portions CP. By a relative movement, preferably as shown by a final movement of the carriage 20 to an end position, with the tips T of the jaws 330, 332 on the carriage 250 having passed beyond the tips 26 of the jaws 28, 29 on the carrier 20 are the corner portions CP pressed into the gap between the jaws 28, 29 of the clamps 25 of the carrier 20, and are retained in the position shown in FIG. 2B by the spring loading of the clamps 25. In one embodiment a portion, such as the shown upwardly extending portion, of one of the jaws 29 may be pressed on mechanically on arriving to the machine 50, so as to open up the aforementioned gap. The clamps 229 of the carriage 250 are then operated by the actuators 280 to release their grip on the corner portions CP following which the carriage 250 is moved back to the original, retracted position while the clamping structures 270 are each at the same time rotated back to the position shown in FIG. 5B by the associated actuators 251.

With the linen item L now being held properly is the carrier 20 moved onwards along the overhead conveyor 5.

It will be understood by the person skilled in the art that activation of the various elements of the transfer mechanism may involve a controller, such as a PC, relying on sensors indicating the presence of linen items L at relevant positions.

Figure 6A:
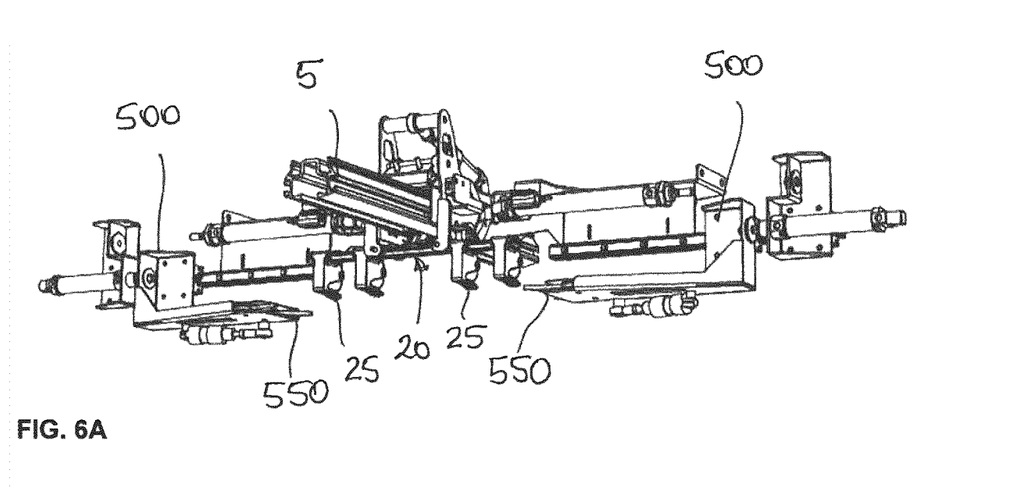
FIGS. 6A and 6B show a correcting mechanism in two positions.
Figure 6B:
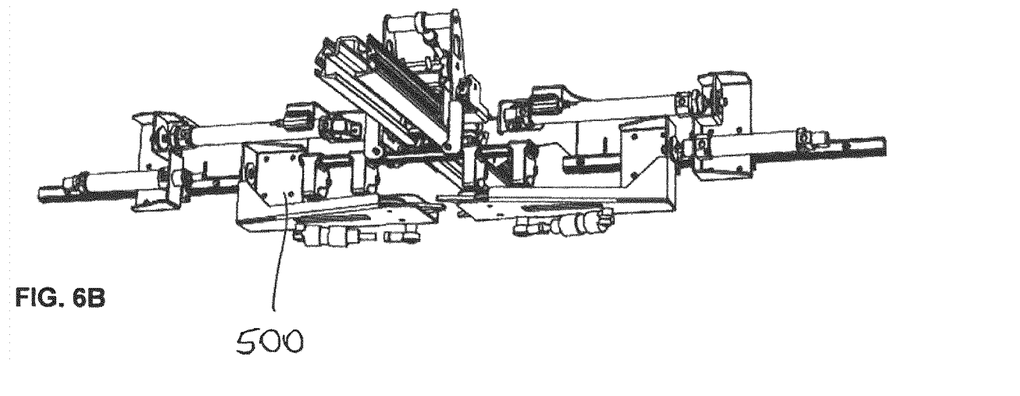

Finally, a correcting mechanism 500 shown in FIGS. 6A and 6B may be formed as an integral part of the machine 50 or located as a separate part downstream towards the spreader E, for applying a force onto the linen item L in the general direction of the elongated corner portions CP to the effect that the material of the linen item L slips slightly between the jaws 28, 29 of the clamps 25 until each of the two corners C of linen item L is aligned with or essentially aligned with the sides of the two outermost clamps A, 25 on the carrier 20. Such an alignment may be preferred to ensure that the spreader clamps of the downstream spreader E may receive and engage the linen item L at a position closest to the corners C, when entering the gap G between two adjacent clamps 25 on the carrier 20. The alignment is achieved by two opposed carriages 550 placed on a respective side of the conveyor 5 and movable to and from each other, compare FIGS. 6A and 6B, when a carrier 20 with clamps 25 carrying a linen item L (not shown) is positioned between the two opposed carriages. Clamps 550 mounted to the opposed carriages 550 grip around a hanging portion of the linen item L held by the clamps 25 and provide that the corner portions CP received by the clamps 25 slip between the jaws as explained above upon further movement of the carriages 550 until the corners C are aligned with the sides of the clamps 25.

While above the invention has been described in the context of a machine having elements in the form of only one carriage including only two clamping devices, a higher number of such elements may be provided within the scope of the appended claims; specifically, more than two clamps may be provided for each clamping device, depending on the configuration of the carriers 20.

The invention claimed is:

1. A machine for the processing of linen items in an industrial laundry, such as for receiving, reorienting and transferring a linen item from a loader to a movable linen carrier, with a transfer mechanism comprising:
   a carriage,
   a drive for moving said carriage between a loading position and a discharge position,
   wherein said carriage includes a frame structure with two spaced apart clamping structures, each clamping structure being rotationally connected to the frame structure to rotate about a respective axis of rotation aligned with a direction along which the carriage moves,
   each clamping structure comprising two spaced apart activatable clamps, and
   actuators for rotation of said clamping structures about said respective axis of rotation and activation of said clamps.

2. The machine of claim 1, said clamping structures each assuming i) a first configuration for receiving and holding an elongated linen item corner portion extending in a generally vertical plane and extending between said two spaced apart clamps, and ii) a second configuration upon said rotation with said elongated linen item corner portion extending generally horizontally and extending between said two spaced apart clamps.

3. The machine of claim 1 further comprising a linen item loader including two opposed conveyor belts for drawing linen items through the loader from a feeding side thereof, whereby two corners at a rear edge of the linen item are the last linen item portions discharged from the loader opposite said feeding side, to present elongated corner portions of said linen item to said clamps while extending in said generally vertical plane.

4. The machine of claim 1, further comprising an elongated guiding structure carrying said transfer mechanism.

5. An industrial laundry including:
   the machine according to claim 1,
   a linen item spreader including linen item spreader clamps,
   an overhead conveyor with linen item carriers,
   said overhead conveyor including a portion arranged at said discharge position of said machine for receiving a linen item from said clamps of said clamping structures,
   said linen item carriers including two clamping devices, each clamping device comprising two clamps, each defined by two opposed jaws, said clamping devices each being for holding an elongated corner portion CP of a linen item such that the corner portion extends generally horizontally, said opposed jaws being spring loaded and opening up when a force is applied on-to the face of one of said jaws when a linen item is pushed in between opposed faces of said jaws.

6. The industrial laundry of claim 5, including a correcting mechanism for applying a force onto said linen item in the general direction of said elongated corner portions to the effect that the material of the linen item slips slightly between said jaws of said clamps of said clamping devices until each of the two corners C of said linen item is aligned with or essentially aligned with sides of the two outermost clamps of said carrier.

7. A method of operating a machine for the processing of linen items in an industrial laundry, with a transfer mechanism comprising:
    a carriage,
    a drive for moving said carriage between a loading position and a discharge position,
    said carriage including a frame structure with two spaced apart clamping structures, each being rotationally connected to the frame structure, the axis of rotation optionally being aligned with the direction along which the carriage moves,
    each clamping structure comprising two spaced apart activatable clamps, and
    actuators for said rotation and said activation of said clamps,
    said clamping structures each being configurable to assume i) a first configuration for receiving and holding an elongated linen item corner portion extending in a generally vertical plane and extending between said two spaced apart clamps, and ii) a second configuration upon said rotation with said elongated linen item corner portion extending generally horizontally and extending between said two spaced apart clamps, the method comprising:
    rotating the two clamping structures to a first configuration with said clamps being open,
    loading a linen item such that two elongated corner portions hang suspended,
    moving said carriage to a position where each one of said two elongated corner portions is received by said two clamps of a respective one of said clamping structure with each of said elongated corner portions extending between said two clamps of a clamping structure,
    closing said clamps to hold on to said corner portions,
    rotating said clamping structures to reorient said corner portions to extend generally horizontally between said two spaced apart clamps of said clamping structure, and
    moving said carriage to a discharge position.

8. The method of claim 7, further including a step of providing at said discharge station a carrier including two clamping devices, each clamping device comprising two clamps, each defined by two opposed jaws, said clamping devices each being for holding an elongated corner portion CP of a linen item such that the corner portion extends generally horizontally, said op-posed jaws being spring loaded and opening up when a force is applied onto the face of one of said jaws, and pushing said corner portion of said linen item in between opposed faces of said jaws.

9. The method of claim 7, said machine further including a linen item loader including two opposed conveyor belts, said method comprising i) drawing said linen item through said loader from a feeding side thereof, whereby two corners at a rear edge of the linen item are the last linen item portions discharged from the loader opposite said feeding side, and ii) presenting elongated corner portions of said linen item to said clamps while extending in said generally vertical plane.

* * * * *